United States Patent [19]

Hoffman

[11] Patent Number: 5,615,277

[45] Date of Patent: Mar. 25, 1997

[54] TOKENLESS SECURITY SYSTEM FOR AUTHORIZING ACCESS TO A SECURED COMPUTER SYSTEM

[76] Inventor: Ned Hoffman, 2529A College Ave., Berkeley, Calif. 94704

[21] Appl. No.: 345,523

[22] Filed: Nov. 28, 1994

[51] Int. Cl.$^6$ ..................................................... G06K 9/00
[52] U.S. Cl. ............................................... 382/115; 902/3
[58] Field of Search ........................ 340/825.34, 825.33, 340/825.31; 382/115, 116, 117, 118, 119, 124, 128; 902/1, 2, 3, 4, 5, 6, 8, 9, 10, 12, 13, 22, 23, 24, 25, 26, 27, 31, 32, 33, 34, 35, 37; 235/375, 376, 379, 380, 381, 382, 382.5, 383, 384, 385, 386

[56] References Cited

U.S. PATENT DOCUMENTS

| | | | |
|---|---|---|---|
| 4,961,142 | 10/1990 | Elliott et al. | 364/408 |
| 5,036,461 | 7/1991 | Elliott et al. | 364/408 |
| 5,229,764 | 7/1993 | Matchett et al. | 340/825.34 |

Primary Examiner—Jose L. Couso
Assistant Examiner—Bijan Tadayon
Attorney, Agent, or Firm—Ali Kamarei

[57] ABSTRACT

A tokenless security system and method for preventing unauthorized access to one or more secured computer systems is shown. The security system and method are principally based on a correlative comparison of a unique biometric sample, such as a finger print or voice recording, gathered directly from the person of an unknown user with an authenticated unique biometric sample of the same type obtained from each authorized user. The security system and method may be integrated with and dedicated to a single computer system, or may be configured as a non-dedicated, stand-alone entity capable of and intended to perform security functions simultaneously for more than one computer system. Further, the stand alone configuration can be networked to act as a full or partial intermediary between a secured computer system and its authorized users, or may be interactive solely with and act as a consultant to the computer systems. The security system and method further contemplate the use of personal codes to confirm identifications determined from biometric comparisons, and the use of one or more variants in the personal identification code for alerting authorities in the event of coerced access.

113 Claims, 3 Drawing Sheets

TOKENLESS SECURITY SYSTEM FOR AUTHORIZING ACCESS TO A SECURED COMPUTER SYSTEM

FIELD OF THE INVENTION

The invention relates generally to security systems designed to control access to restricted areas, and more specifically to security systems for controlling individual access to secured computer systems.

BACKGROUND OF THE INVENTION

The rapid, efficient and secure transaction of financial and other services is becoming critical to the competitiveness of individual businesses and national economies. In the past, financial transactions were necessarily slow and cumbersome, generally requiring an individual to verify his identity by meeting with a representative of the financial institution responsible for executing the transaction. Although inconvenient and somewhat inflexible, such systems were useful in reducing transaction fraud because they predicated verification of the individual's identity based on certain unique biometric data, such as one's signature, physical appearance, voice character, etc, in addition to the individual's personal knowledge of his financial account numbers and secret codes.

With the advent of computerized financial networks, the problem of transaction fraud has become keenly acute, facing not only private business, but local, state and federal governments as well. In order to cut costs and increase the flexibility of making financial transactions, many financial institutions have greatly reduced staff and office hours in favor of automated teller machines ("ATM"s), which provide the consumer with round the clock access to his various accounts and allow the consumer to make financial transactions without visiting a bank. More recently, retail establishments have taken advantage of the existence of such computerized banking services by installing apparatus capable of reading a consumer's ATM card and making a direct debit from the consumer's account at the point of purchase. Unfortunately, the use of ATMs and similar devices has greatly increased transaction fraud because in such systems verification of a user's identity is not predictated on unique biometric data. Rather, all that is required for verification is the presentation of a token, such as a credit card or ATM, and the entry of the personal identification number ("PIN") encoded in a magnetic strip on the token. It is estimated that billions of dollars are lost annually through transaction fraud. Ultimately, these costs are passed back to the consumer in the form of higher prices for goods and services, and in the form of higher taxes.

Today, a considerable proportion of financial transactions, stock trading, commodity trading, business purchases and billings are transacted electronically. In these systems, the necessary data for identifying and locating the user's accounts are magnetically recorded on a token that user must insert into the ATM or similar device to initiate access to his accounts. The token is further provided with a personal identification number ("PIN"), which ideally is known only to the user and the financial institution controlling the account. Although the combination of an account number and PIN will be unique to the user, the ability to possess and communicate such data will not be unique to the user. Rather, existing security systems of computer networks will recognize anyone capable of entering the appropriate account and PIN as the authorized user of those accounts. Further, in most instances, access will be dependant upon the physical presentation of the appropriate token. Known security systems for limiting access to secured computer systems require that authorized user to possess and present a unique (but reproducible) token, such as a credit card or ATM card, and require the user to know and present a personal identification code, which is generally numeric in character.

Unfortunately, this almost universal system of access to secured systems has very serious flaws. First, access can be gained by anyone possessing the appropriate token and knowledge of the PIN linked to the token and ultimately to the user's account. The rapid increases in ATM crime and counterfeit credit card scares are testament to this point. Although token and code security systems do reduce the risk of unauthorized access, such security systems are nevertheless significantly susceptible to fraud. Because verification of user identity is based solely on data that can be easily reproduced and transferred between individuals, as opposed to data that is unique to and irreproducible from the user, such security systems must rely on both the diligence and the luck of the authorized user in maintaining this information as proprietary. The significant increase in ATM crime and counterfeit credit card scams are testament to the weaknesses of these systems, as are the plaintiff cries of the head of household who unwisely tendered both token and code to a less than thrifty friend or family member.

In addition to the significant ongoing risk of fraud, token and code security systems are frequently cumbersome for consumers to use. First, the consumer must physically possess the token in order to initiate access to the desired account. This inconvenience is greatly compounded by the fact that consumer often maintains a variety of active financial accounts, each issuing its own unique token and code. This requires the consumer not only to carry numerous tokens, but to remember each specific code for each specific token. Of course, a proliferation of tokens decreases the ability of the consumer to maintain the high degree of proprietary control upon which the token and code system relies.

Recently, various workers have attempted to overcome problems inherent in the token and code security system. One major focus has been to encrypt, variabilize or otherwise modify the PIN code to make it more difficult for an unauthorized user to carry out more than one transaction, largely by focusing on manipulation of the PIN access code to make such code more fraud resistant. A variety of approaches have been suggested, such introducing an algorithm that varies the PIN in a predictable way known only to the user, thereby requiring a different PIN code for each subsequent accessing of an account. For example, the PIN code can be varied and made specific to the calendar day or date of the access attempt. In yet another approach, a time-variable element is introduced to generate a non-predictable PIN code that is revealed only to an authorized user at the time of access. Although more resistant to fraud that systems incorporating non-variable codes, such an approach is not virtually fraud-proof because it still relies on data that is not uniquely and irreproducibly personal to the authorized user. Further, such systems further inconvenience consumers that already have trouble remembering constant codes, much less variable ones. Examples of these approaches are disclosed in U.S. Pat. Nos. 4,837,422 to Dethloff et al.; U.S. Pat. No. 4,998,279 to Weiss; U.S. Pat. No. 5,168,520 to Weiss; U.S. Pat. No. 5,251,259 to Mosley; U.S. Pat. No. 5,239,538 to Parrillo; U.S. Pat. No. 5,276,314 to Martino et al.; and U.S. Pat. No. 5,343,529 to Goldfine et al. all of which are incorporated herein by reference.

More recently, some workers turned their attention from the use PIN codes to the use of unique biometric data as the basis of identity verification, and ultimately computer access. In this approach, an authenticated biocharacteristic is voluntarily recorded from a user of known identity and stored for future reference. In every subsequent access attempt, the user is required to enter physically the requested biocharacteristic, which is then compared to the authenticated biocharacteristic to determine if the two match in order to verify user identity. Because the biocharacteristic is uniquely personal to the user and because the act of physically entering the biocharacteristic is virtually irreproducible, a match is putative of actual identity, thereby decreasing the risk of fraud. Various biocharacteristics have been suggested, such as finger prints, hand prints, voice prints, retinal images, handwriting samples and the like. However, because the biocharacteristic is generally stored in electronic (and thus reproducible) form on a token and because the comparison and verification process is not isolated from the hardware and software directly used by the individual attempting access, a significant risk of fraudulent access still exists. Examples of this approach to system security are described in U.S. Pat. Nos. 4,821,118 to Lafreniere; U.S. Pat. No. 4,993,068 to Piosenka et al.; U.S. Pat. No. 4,995,086 to Lilley et al.; U.S. Pat. No. 5,054,089 to Uchida et al.; U.S. Pat. No. 5,095,194 to Barbanell; U.S. Pat. No. 5,109,427 to Yang; U.S. Pat. No. 5,109,428 to Igaki et al.; U.S. Pat. No. 5,144,680 to Kobayashi et al.; U.S. Pat. No. 5,146,102 to Higuchi et al.; U.S. Pat. No. 5,180,901 to Hiramatsu; U.S. Pat. No. 5,210,588 to Lee; U.S. Pat. No. 5,210,797 to Usui et al.; U.S. Pat. No. 5,222,152 to Fishbine et al.; U.S. Pat. No. 5,230,025 to Fishbine et al.; U.S. Pat. No. 5,241,606 to Horie; U.S. Pat. No. 5,265,162 to Bush et al.; U.S. Pat. No. 5,321,242 to Heath, Jr.; U.S. Pat. No. 5,325,442 to Knapp; U.S. Pat. No. 5,351,303 to Willmore, all of which are incorporated herein by reference.

As will be appreciated from the foregoing discussion, a dynamic but unavoidable tension arising in attempting to design a security system that is highly fraud resistant, but nevertheless easy and convenient for the consumer to use. Unfortunately, none of the above-disclosed proposed improvements to the token and code system adequately address, much less attempt to balance, this tension. Such systems generally store the authenticated biocharacteristic in electronic form directly on the token that can easily be copied. Further, such systems do not adequately isolate the identity verification process from tampering by someone attempting to gain unauthorized access.

An example of token-based security system which relies on a biocharacteristic of a user can be found in U.S. Pat. No. 5,280,527 to Gullman et al. In Gullman's system, the user must carry and present a credit card sized token (referred to as a biometric security apparatus) containing a microchip in which is recorded characteristics of the authorized user's voice. In order to initiate the access procedure, the user must insert the token into a terminal such as an ATM, and then speak into the terminal to provide a biocharacteristic input for comparison with an authenticated input stored in the microchip of the presented token. The process of identity verification is generally not isolated from potential tampering by one attempting unauthorized access. If a match is found, the remote terminal may then signal the host computer that access should be permitted, or may prompt the user for an additional code, such as a PIN (also stored on the token), before sending the necessary verification signal to the host computer.

Although Gullman's reliance of comparison of stored and input biocharacteristics potentially reduces the risk of unauthorized access as compared to numeric codes, Gullman's use of the token as the repository for the authenticating data combined with Gullman's failure to isolate the identity verification process from the possibility of tampering greatly diminishes any improvement to fraud resistance resulting from the replacement of a numeric code with a biocharacteristic. Further, the system remains somewhat cumbersome and inconvenient to use because it too requires the presentation of a token in order to initiate an access request.

Thus, it will be appreciated that there has long been a need for a computer access security system that is both highly fraud-resistant and that is convenient and efficient for the user to operate.

There is also a need for a security system that is capable of verifying a user's personal identity, based upon an irreproducible biocharacteristic that is unique and physically personal to an authorized user, as opposed to verifying an individual's possession of physical objects and information that can be transferred freely between different individuals. Such a biocharacteristic must be easily and non-intrusively obtained; must be easy and cost-effective to store and analyze; and must not unduly invade the user's privacy rights.

A further need in computer access security system design is user convenience. It is highly desirable for a consumer to able to access the system spontaneously, particularly when unexpected needs arise, with a minimum of effort. In particular, there is a need for a security system greatly reduces or eliminates the need to memorize numerous or cumbersome codes, and that eliminates the need the need to possess, carry, present a proprietary object in order to initiate an access request.

Such systems must be simple to operate, accurate and reliable. There is also a need for a computer security access system that can allow a user to access all accounts and procure all services authorized to the user, such as access and carry out transactions in and between all financial accounts, make point of purchase payments, receive various services, etc.

There is further a great need for a computer security access system that affords an authorized user the ability to alert authorities that a third party is coercing the user to request access without the third party being aware that an alert has been undertaken. There is also a need for such a system that is nevertheless able to effect, unknown to the coercing third party, temporary restrictions on the types and amounts of transactions that can be undertaken once access is granted.

Finally, the security system must be affordable and flexible enough to be operatively compatible with existing networks having a variety of transaction devices and system configurations.

SUMMARY OF THE INVENTION

It is an object of the invention therefore to provide a computer access security system that eliminates the need for a user to possess and present a physical object, such as a token, in order to initiate a system access request.

It is another object of the invention to provide a computer access security system that is capable of verifying a user's identity, as opposed to verifying possession of proprietary objects and information.

It is yet another object of the invention to verify user identity based upon one or more unique and irreproducible characteristics physically personal to the user.

Yet another object of the invention is to provide a system of secured access that is convenient and easy use.

Still another object of the invention is to provide a system of secured access to a computer system that is highly resistant to fraudulent access attempts by non-authorized users.

Yet another object of the invention is to provide a computer access security system that enables a user to notify authorities that a particular access request is being coerced by a third party without giving notice to the third party of the notification.

There is also a need for a computer access security system that automatically restricts a user's transactional capabilities on the computer system according a desired configuration provided by the user indicates that a particular access request has been coerced or is otherwise involuntary.

The invention meets these and other objects by providing tokenless system and method for verifying the identity of user requesting access to a secured computer network, eliminating the need to present an object in order to initiate and carry out an access request.

The invention also meets these objects by providing a significantly improved system and method for determination of the identity of a user based on the user's direct input of unique, irreproducible biometric data, as opposed to less reliable existing systems that determine the identity of a user based upon the presentation of a correct combination of token and one or more codes and the assumption that the individual presenting the token and codes is the individual authorized to possess them.

Further, these objects are met by providing a security system and method in which certain programs and data within the computer access verification system are isolated from and inaccessable to the user, at least until the access requested has been granted. According to the invention, actual verification of user identity is isolated from possible tampering by the user requesting access. More importantly, all stored authenticated biometric data used in the verification process is also isolated from access by the user until the user's identity has been verified, thereby preventing the counterfeiting and reuse of the authenticated data to gain fraudulent access.

According to one embodiment of the invention, the security system is incorporated as a subroutine or program within the host computer system that the user desires to access. In this embodiment, the system comprises a means for gathering and recording one or more desired types of biometric data directly from the person of the individual requesting computer access; a memory means for recording, storing and retrieving authenticated biometric data of users authorized for access to the secured computer system; comparison means for comparing the input biometric data with authenticated biometric data of authorized users and verifying user identity based upon the comparison; and transmission means for transmitting the input biometric data to the comparison means.

In operation, the user enters biometric data directly from his person, such as by pressing a finger or thumb print onto a sensor pad. This input data is then transmitted to another part of the system that is operatively isolated from the user. Here the input biometric data collected from the user is compared to authenticated biometric data collected from each individual authorized to obtain access to the secured computer system. If the input biometric data matches the authenticated biometric data, the identity of the user requesting access will be verified and the host system directed to provide access.

According to another embodiment of the invention, the security system operates as a stand alone entity. The system may be positioned in series between the user and secured computer network, thereby acting as an interface, or it may be positioned in parallel with the user relative to the secured computer system.

It will be appreciated that in the former system, the user tenders an access request directly to the security system of the invention, which ideally is operationally interactive with numerous independent secured computer systems. The security system would therefore maintain authenticated biometric data samples for all authorized users of each secured computer system that it serviced. These data would be cross-referenced by each authorized user. Thus, after identity verification was completed, the security system would provide to the user a listing of systems that he is authorized to access, and prompt the user to select the desired network. The security system would then forward the access request along with its identity verification to the selected secured computer system, ultimately connecting the user to the requested secure computer system.

In the later system, a user tenders an access request directly to the secured computer system that he wishes to use. Generally, it is contemplated that the request would be made at a terminal specifically dedicated to the desired computer system. Upon receipt of the input biometric data from the user, the secured computer network would forward said data to the security system of the invention, where a verification of the user's identity would be determined from comparison with authenticated biometric data from authorized users of the secured computer system. The result of the comparison would then be returned to the secured computer network and access granted if the identity of the user requesting access was determined to be the same as one of the authorized users of the secured computer system.

In addition to the comparison of input and pre-recorded biocharacteristics, the invention further contemplates the use of one or more confirmation codes to be known to and entered by the user requesting access after entry of the biometric data discussed above. A determination of identity could then proceed in a single or multi-step fashion. The software of the system may be configured to combine the input biometric data with the one or more codes requested, and thereby generate a single profile for comparison against pre-recorded profiles of authorized users. Alternatively, the system may verify identity in a linear, step-wise fashion, making a first determination of identity based upon similarity of biometric data, thereafter confirming this determination by prompting the user to enter a code, which the security system would then compare to the code assigned to identity determined in the first step.

According to a further embodiment of the invention, a means is provided for alerting predesignated authorities during an access attempt that the user has been coerced to request access by a third party. In such an embodiment, an authorized user would have a number of codes, one of which would be recognized by the security system as the standard access code, and the remainder of which would be recognized as emergency codes. The comparison means of the security system of the invention would be configured to accept and recognize more than one code per authorized user, and to activate the emergency alert means whenever the code entered by the user matched an emergency code. At the same time, the determination of an authorized identity for the user would result in the user being afforded access to the requested secured computer system, thereby preventing the coercing third party from knowing that an emergency notification had been entered by the user. Ideally, the emergency code would be entered as a part of or simultaneously with the user's secret code.

According to another embodiment of the invention, an access limiting means is contemplated for use where access has been coerced by a third party. As discussed above, the invention includes an emergency alert means. The well-being of the user requesting access might be jeopardized if the coercing party discovered that the user was attempting to notify authorities. Thus, it is critical that the access procedure continue uninterruptedly and that access be granted to an authorized user so that the coercing party believes that everything is proceeding normally. However, it will be appreciated that the coercing party's full and unfettered access to the secured computer system may cause the authorized user serious harm as well, particularly if access permits the coercing party access to make transactions from the authorized user's financial accounts. Thus, according to the invention, the security system is provided with means for limiting access when the request for access has been coerced. In such instances, the security system would not only forward verification of identity to the secured computer system to be accessed, but also a request for limited access. The secured computer system would thereafter grant access, but with limitations that would be transparent to the coercive party. For example, if the authorized user had more than one checking account, under coerced access mode, only the account with the least money would be accessed. Alternatively, the system could be configured to prohibit transactions above a particular monetary threshold. In such a case, the secured computer system would also generate temporary dummy accounts to reflect only enough money or credit to transact a particular transaction. Further, the secured computer may be configured to display that a particular transaction has taken place, but then abort the transaction, such as charging an item to a line of credit or wire transferring funds to another account. The system may also generate and appropriate malfunction screen indicating that the type of transaction selected is not presently available due to mechanical or some other plausible failure. As with the emergency notification means, however, it is imperative that any access limitation that is imposed be transparent to the coercing party.

The present invention is clearly advantageous over the prior art in a number of ways. First, it is extremely easy and efficient for the user, particularly where the user is accessing financial accounts, because it eliminates the need to carry and present a unique token in order to access one's accounts. The present invention eliminates all the inconveniences associated with carrying, safeguarding and locating a desired token. And because each token is often specific to a particular computer system that further requires remembering a secret code assigned to the particular token, the elimination of tokens reduces the amount of memorization and diligence required increasingly of consumers, who are see everything from banking transactions and long distance telephone calling to point of purchase debits being conducted electronically using tokens and secret codes. Rather, in a single, seamless, tokenless, and optionally codeless transaction, the consumer, by mere entry of a biocharacteristic such as a fingerprint and the selection of a desired account, can conduct virtually any commercial exchange transaction, from withdrawing cash from a bank account to paying the babysitter, from making a telephone call to Fiji to paying local property taxes.

The invention is clearly advantageous from a convenience standpoint to retailers and financial institutions by making purchases and other financial transactions less cumbersome and more spontaneous. The paper work of financial transactions is significantly reduced as compared to current systems, such as credit card purchase wherein separate receipts are generated for use by the credit card company, the merchant and the consumer. Such electronic transactions also save merchants and banks considerable time and expense by greatly reducing operational costs. Because the system of the invention is designed to provide a consumer with simultaneous direct access to all of his financial accounts, the need for transactions involving money, checks, commercial paper and the like will be greatly reduced, thereby reducing the cost of equipment and staff required to collect and account for such transactions. Further, the manufacturing and distributing costs of issuing and reissuing credit cards, ATM cards, calling cards and the like will be eliminated, thereby providing further economic savings to merchants and banks. In fact, the system of the invention will likely encourage consumer spending since all of a consumer's electronic financial resources will be available at the mere input of his fingerprint or other biocharacteristic.

The invention is markedly advantageous and superior to existing systems in being highly fraud resistant. As discussed above, present security systems are inherently unreliable because they base determination of a user's identity on the physical presentation of a unique object and unique information that is intended to be and by the security system presumed to be within the proprietary possession of the authorized user. Unfortunately, both the unique token and information can be transferred to another, through loss, theft or by voluntary action of the authorized user. Thus, unless the loss or unintended transfer of these items is realized and reported by the authorized user, anyone possessing such items will be recognized by existing security systems as the authorized user to whom that token and information is assigned.

By contrast, the present invention virtually eliminates the risk of granting access to a non-authorized users by determining user identity from an analysis of one or more of a user's unique, physically irreproducible biometric characteristics. Except in the very rare circumstance of a kidnapping, where the authorized user is by a third party to access his accounts, the system of the present invention eliminates the unauthorized use of a secured computer system from a point external to the system.

The invention further enhances fraud resistance by maintaining authenticating data and carrying out the identity verification operations at a point in the system that is operationally isolated from the user requesting access, thereby preventing the user from acquiring copies of the authenticating data or from tampering with the verification process. Such a system is clearly superior to existing token-based systems wherein authenticating information, such as personal codes, is stored on and can be recovered from the token, and wherein the actual identity determination is potentially in operational contact with the user during the access process.

These and other aspects of the invention will become apparent from a consideration of the detailed description and claims set forth below.

DETAILED DESCRIPTION OF THE INVENTION

General Overview

Figure 1:
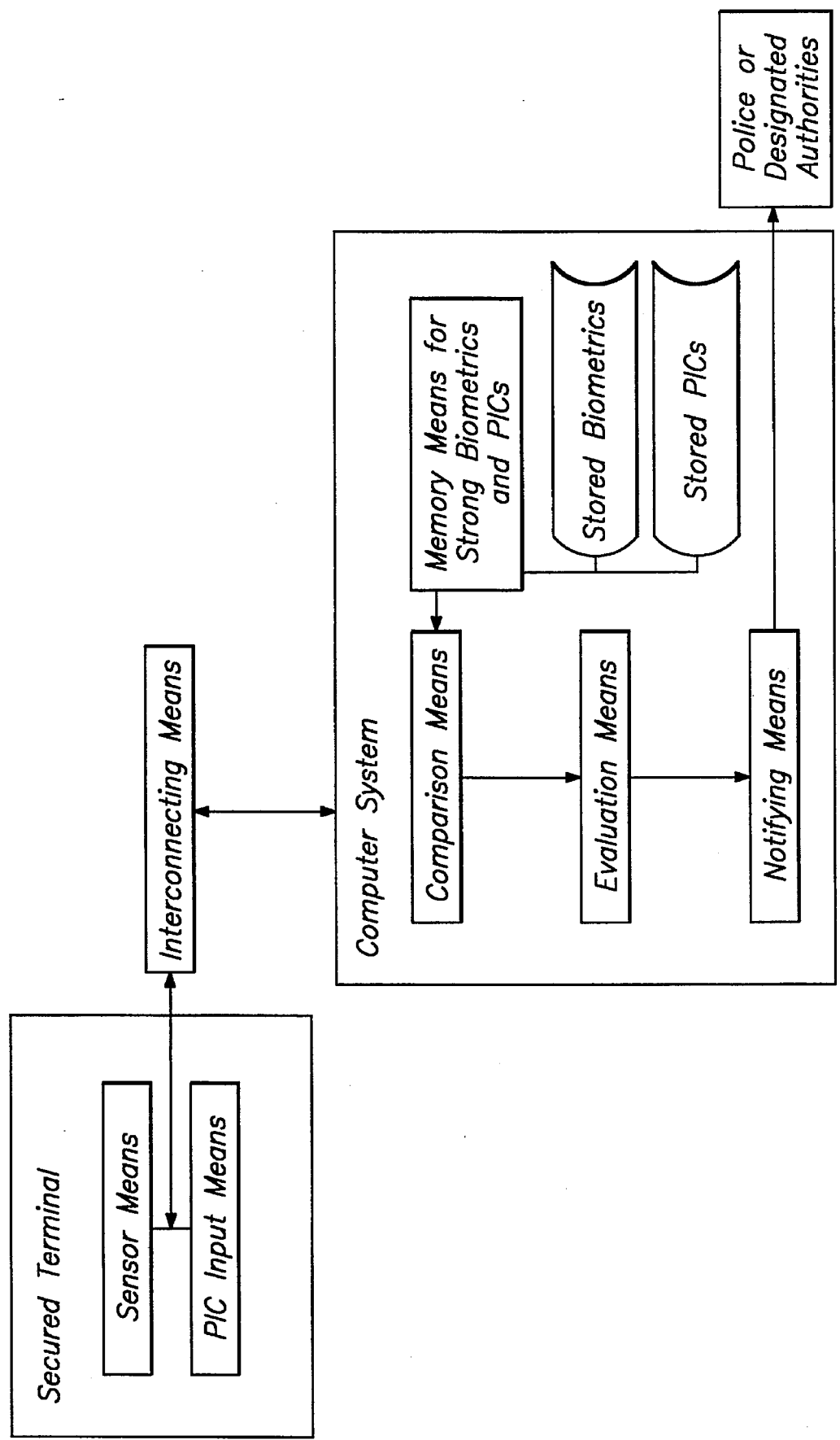
FIG. 1 is a diagram of an embodiment of the apparatus of the invention.
Figure 2:
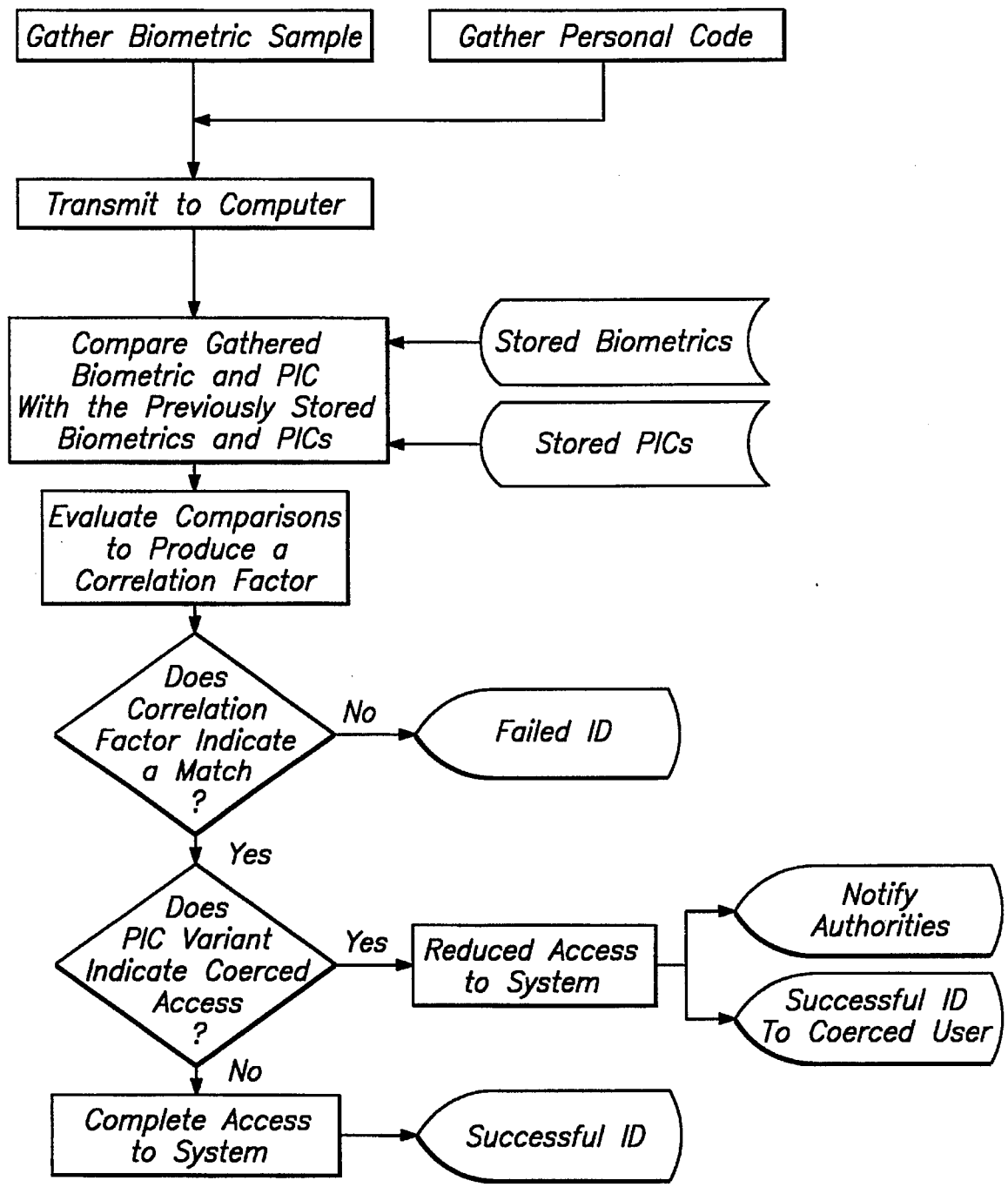
FIG. 2 is a flow chart of the method of the invention.
Figure 3:
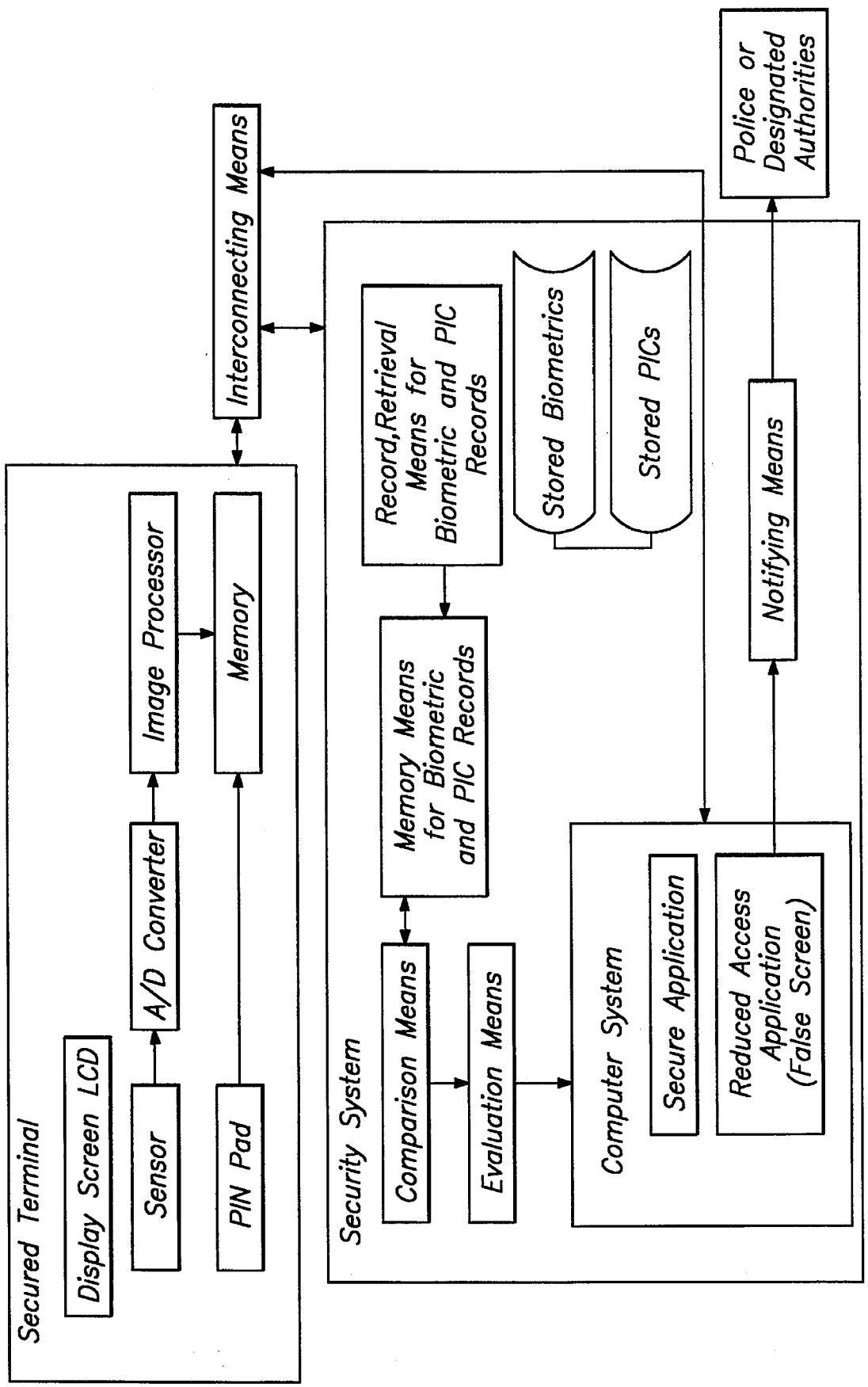
FIG. 3 is a diagram of a second embodiment of the invention.

The present invention is directed to systems and methods for securing all or a portion of a computer system or network. By secure, we mean a computer system in which access is limited to authorized users. It will of course be appreciated that access is a relative term. Computer systems are generally comprised of numerous applications which may themselves be subdivided into routines and subroutine. A user may be authorized to work with the system as a whole, or may be limited in to particular applications; may be limited to particular manipulations or may have access to the entire range of systems capabilities but only at specified times. Although it will be appreciated that the security system of the present invention is useful for partially limiting a user's access to parts of a computer system once the user has obtained initial access, the embodiments described below are directed more broadly to the problem of differentiating generally between individuals who are authorized for any degree of access to a particular computer system and those that are not.

By user, we mean any entity, human or machine, that may communicate and interact with the secured computer system. User may apply to a group of individuals, or may be applied to a single, unique entity. Once verified as an authorized user, it makes little difference to the operation of the computer system whether the individual is a unique entity a member of a common class. However, in determining identity, and thus authorization to connect and interact with the computer system, there is a critical difference between unique individuals and class members regarding the types of data that can be used to determine identity. Identification of a group member necessarily relies on presentation one or more identifying features uniquely shared by the group as a whole, which generally takes the form of shared unique information, such as codes or passwords, and/or possession of a unique object, such as a key or pass card. In fact, the security systems of most computer systems today rely on the use of a unique combination of object and information, herein referred to as token and code security systems, to identify both unique individuals and classes alike. Identification of a unique individual, on the other hand, need not be based on assigned the individual some secret code or card, but rather may be based on a unique but satisfactorily quantifiable corporeal feature of the individual. The embodiments of the invention set forth herein are directed to securing computer systems that recognize individuals as opposed to groups as authorized users.

Although applicable to and useful for limiting user access to any type of computer system, the invention is described below with particular reference to computer systems supporting consumer commercial transactions such as banking, retail purchasing, stock trading, credit transactions such as credit cards purchases, mortgage payments and loan payments, long distance and cellular telephone services, pay television and radio programming, home shopping, on-line computer services and the like.

All embodiments of the invention share the same key features. First, the security systems and methods of the invention eliminate the possession and presentation of a unique object as a basis for verifying user identity. Accordingly, we refer to the security systems and methods of our invention as "tokenless."

Second, our invention utilizes irreproducible biometric data unique to and quantifiably derivable from an individual as the primary basis for determining the individual's identity, and ultimately whether to the individual is recognized as an authorized user of the computer system. Further, all embodiments of the invention share the requirement that biometric data must be input directly by the user in sonic or physical contact with the system.

Finally, all embodiments share the same security features regarding the storing an accessing of authenticated biometric data samples of authorized users and the operation of the identity verification means that compare data samples and determine identity. Unlike existing security systems, our invention restricts not only the user requesting access, but ideally most authorized users from viewing, copying or manipulating the samples in any way. Once again, unlike existing systems, the system of our invention analyzes biometric samples and makes identity determinations isolated from any type of interactional contact with the user who has requested access. Strictly limiting access to these aspects of the system virtually eliminates the possibility of an unauthorized individual gaining access by presenting a stolen, but authentic biometric data sample or by attempting sabotaging the identity verification process.

Although each is representative of our invention, the embodiments described below may be subdivided into two basic classes: integrated. Security systems each of which is dedicated to and integrated within a single computer system, and stand alone security systems each of which stands alone and supports user identity verification for two or more separate computer systems. The second class may be further subdivided into two subclasses: (1) security systems that act partially or completely as intermediary between the user requesting access and the secured computer system and (2) security systems that act solely with security systems as a consultant.

Integrated Security Systems

In a first embodiment, the security system of the invention is configured to be partially to fully operationally integrated with a dedicated to a specific secured computer system, such as a consumer banking system, a credit card account system or the like. In such an embodiment, the security system may operate as a gateway, both determining the identity of a user requesting access and granted such access. Alternatively, the security system may merely operate to identify a user that is authorized for some type of access within the system, while other components of the computer system determine and grant the specific access accorded to the identified user.

In structure, the security system is provided with means for gathering and recording one or more biometric samples of one or more types physically from the person of the unidentified user that is requesting access to the secured computer system. Structurally, these means will vary depending upon the type of biometric data to be obtained and are discussed in greater detail below. Generally speaking, the means will include a sensor appropriate for recording the sample, conversion apparatus for converting the sample into an analog or digital electronic signal and memory of some type for storing the recorded sample at least temporarily until the sample can be transmitted for comparison. These means also provide a display screen or communication apparatus for providing the unidentified user with directions for entry of the data required for identity determination. In practice, existing ATM's and pay point devices could be easily modified to support the means contemplated and described herein. Further, with more effort, personal computers, televisions, telephones and any other device capable of communication with a computer network could be modified to provide these means.

It will be appreciated that from a practical standpoint, the biometric sample gathering means with be physically remote from the actual hardware and software of the security apparatus, and that for the convenience of the user, such as any consumer desiring to transact financial business, make a purchase, etc. that numerous such sample gathering means at a wide variety of geographical locations must be provided in order to make the computer system easy to access and use. Further, it is important that the gathering means be simple and straightforward to use, without requiring high levels or maintenance, and be clean and safe in view of the type of biometric sample to be obtained.

It is also important that the gathering means in some sense operationally isolate the unknown user, so that the unknown user is unable to interact with and fraudulent manipulate the security system to gain unauthorized access to the computer system. Thus, although the gathering means will be physically proximate to communication means allowing the user to interact with the system once access is granted, it is important that the gathering means limited only to the collection of biometric data and/or codes and otherwise be isolated from all other operations of the security and computer systems.

Once gathered and recorded, the biometric sample is transmitted to the security apparatus where the biometric sample is recorded and stored in memory until it can be analyzed.

It will be appreciated that according to the invention each newly authorized user of a secured computer system will be required to verify his identity in a way deemed satisfactory by operators of the computer system and then provide biometric samples of a desired type to be stored within the security system. Such samples are said to be authenticated because they were obtained from an individual that had verified his identity by alternate means. The security system also comprises memory means for the recording, storing, retrieving and identification of authenticated biometric samples obtained from each of the computer system's authorized users. These samples are stored within a special memory region within said security or computer system to which access is limited to necessary systems functions (such as identity verification) and to personal charged with the duty of updating the samples as the roster of authorized users varies.

The security system is further provided with means for comparing the biometric sample of particular type obtained from the unidentified individual with an authenticated biometric sample of the same type obtained from each of the computer system's authorized users. By means of statistical analysis known in the art and carried in software resident in the security system's comparison means, a numerical value herein termed a correlation factor, is generated for each comparison, labeled and stored until all pertinent comparisons have been made and analysis of correlation factors commenced. For the purposes of this detailed description, any first order comparison of pairs of biometric samples is termed a correlation factor of the first type.

The security system is further provided with a determination means comprised of software that analyzes each correlation factor to determine the degree of correlation in each sample pair. It will be understood that the process of gathering and recording a complex biometric sample, which is then reduced to an electronic signal, will introduce some degree of variability and therefore error in the sample. Thus, it is possible for two biometric samples of the same type taken from the same individual almost certainly will not be identical. Therefore, the determination or evaluation means will determine the unknown individual to have the same identity as an authorized user when the degree of correlation between the samples exceeds a predetermined value, as discussed in more detail below.

In the most basic system, the determination of identity based upon comparison of a single reliable biometric characteristic will be sufficient. If the unidentified user is determined to be a recognized authorized user of the computer system, either the security system will directly grant the user access, or it will communicate the identity determination to another system within the computer system which ultimately determines whether and the degree to which to grant access to the user.

It is also possible to increase system security by requiring more than one sample for an analysis. For instance, the gathering means could be equipped to obtain more than one type of biometric sample, and the comparison and evaluation means configured to analyze sample clusters of the unidentified user against the same sample clusters of authorized users. Alternatively or additionally, authorized users may be each assigned a personal code. This code would be assigned by the system and known only to the system and to the authorized user.

In an embodiment using personal codes, the security system just described would be modified as follows. First, the gathering means would be adapted to gather the biometric sample and to request entry of a personal code. The security system would be further provided with means for receiving and storing the entered code of the unknown user and would have an access limited memory means for storing the assigned codes of each of the computer systems authorized users. In operation, the evaluation means would be provided with a determination routine for evaluating each first type correlation factor and therefrom making a preliminary determination of identity. The evaluation means would further include a confirmation routine which would compare the personal code of the identified authorized user with the personal code of the unknown user, and confirm the preliminary determination of the determination routine if the codes matched.

In a variation on the use of a personal code, the comparison means of the security system may be modified to combine biometric sample-personal code pairs to generate a correlation factor of a second type. The evaluation means would then carry out the necessary similarity analysis on each second type correlation factor to determine whether unknown user is one of the system's authorized users.

Stand-Alone Security Systems

In addition to the configuration described above, the invention can also be embodied in one or more stand-alone configurations. By stand alone, it is intended that the security system for the most part be operationally, and very likely physically, isolated from both the computer systems that are secured by the system and from the authorized users of the system. Thus, the security system may be configured to operate as a go between, accepting access requests from authorized users, making identity determinations and then forwarding such determinations to the appropriate computer networks. Alternatively, the system may be operationally confined to interacting only with one or more computer systems. In this scenario, the computer system would receive an access request directly from the user and forward the identifying data to the security system which would then determine whether the user was authorized and return such determination to the computer system. In other respects, the stand alone configurations of the security system of the invention are structured and function the same as the integrated embodiment described in further detail above.

Collecting and Analyzing Biometric Data

It will be apparent by now that one of the key aspects of the security system and method of this invention is the reliance on unique complex morphological features of an individual as means of direct determination of the individual's identity. In times past, this was practiced, though less accurate means of recognizing individuals with authority to enter restricted areas, make restricted transactions and the like. The individual would be known to the officials of the institution, and would have to be physically present and made known to such officials between being allowed to carry out for example a restricted transaction such as a withdrawal of cash from an account.

The advantages of using biometric data cannot be underemphasized. First, unlike present token and code systems, no assumptions need be made as to whether the individual presenting the object or information is the same individual to which the object or information was assigned. A morphological feature of one's body is of course integral and insuperable, and if sufficiently complex, the feature will not be counterfeitable in sufficient detail and with sufficient accuracy to permit another to use and thus disguise themselves as the true possessor of the feature. Thus, it is possible to determine identity directly, as opposed to assumptively as is the case in present systems, and to determine such identity more accurately.

The use of physical characteristics for identification is also advantageous because it is highly convenient for the user, particularly the consumer where access to computer systems, such as banking, credit cards, retail establishments, etc. occur sporadically and unpredictably. Thus, systems relying on physical characteristics eliminate the need to card cards or other tokens, thereby easing considerably the life of the average user. The elimination of tokens further simplifies the business of merchants, banks and credit card companies by reducing fraud and eliminating the costs of manufacturing, distributing, replacing and keeping track of tokens such as credit and ATM cards.

The present invention contemplates the use of any biocharacteristic that meets the following criteria. First, the feature must be unique to the individual and must be fixed in its measurable aspects. Seconds, it must be of sufficient complexity to maintain its unique identifiability even if error is introduced during the measurement, transmission and comparison operations of the security system. It must also be non-intrusive to the user who asked to input the sample. Finally, it must be relatively quick and easy to obtain a sample of the feature.

Based on these criteria, the following types of biometric data are suitable to the present invention: voice prints; finger, thumb and or palm prints; handwriting samples; and retinal scans. Of these, it is preferred in the present invention to use a thumb or finger print the taking of which is minimally invasive to the user, the structure of which is sufficiently complex that a obtaining a full and complete print is not required for accurate determination, and the measurement of which is quick and simple. Means for collecting and analyzing finger prints biometrically and for determining identification therefrom are set forth in U.S. Pat. Nos. 5,325,442 to Knapp, U.S. Pat. No. 5,222,152 to Fishbine et al, U.S. Pat. No. 5,351,303 to Willmore, each of which is incorporated by reference herein.

Enhancing Security With Personal Codes

As discussed already, personal codes and similar memorized data can be used as a further level of protection and security in the security system of the invention. In the most basic form, as described above, each authorized user is assigned a personal code known only to the system and to the authorized user. This, when an unidentified user requests access, a preliminary determination of identity will be made based on compared biometric samples. Once a preliminary determination reached, and the user matched to one of the computer system's authorized users, the security system will confirm the determination by comparing the personal code of the identified authorized user with the personal code already entered or now prompted from the unidentified user. A match between the codes would confirm the identification and the process of granting access proceed.

Unlike a person's complex morphological characteristics, codes are symbolic and thus easily copied or transferred from one individual the next. Thus, once a user is compelled to disclose his personal code, any third party could reuse the code for gaining subsequent access to the computer system.

According to another aspect of the invention, further security can be obtained by variabilizing the personal code so that every access attempt, or even transaction within a computer system once access has been secured, requires a new code identifiable by the computer system and determinable by the authorized user. In one embodiment, each authorized user is supplied with a starting code and an algorithm when system access is first authorized. The algorithm is used to variabilize the starting code to generate a series of unique personal codes each with a fixed numerical position relative to the starting code, which is assigned the position of one. The security system described above is modified in this embodiment to assign and keep track of the starting code and algorithm provided to each authorized user. The security system is also provided with means for recording and adding together the total number of access attempts carried out by each authorized user, and for assigning a numerical position to the next following access attempt for each authorized user and to cross-reference the access attempt having that specific numerical position with that user's unique personal code having the same numerical position. In this way each access attempt by a particular authorized user of a particular system will have unique personal code that cannot be determined without knowledge of both the starting code and the algorithm. Such a unique personal code would operate the same as a standard code, either being used as a confirmatory check on identity determination, or being combined with the biometric sample to form a part of the correlation present and ascertainable from an evaluation of the correlation factor.

Of course, less complicated variabilizing methods are possible. In one approach, the personal code is made variable based on a repeating cycle based on time as opposed to access attempt number. Thus, an authorized user may be provided with seven discrete codes, each valid only for a particular day of the week, or twelve codes each of which is valid for one month of the year, and so on. Other methods of increasing the security of personal codes are disclosed in U.S. Pat. Nos. 4,998,279 and 5,168,520, both to Weiss, and U.S. Pat. No. 5,239,583 to Parillo, each of which is specifically incorporated herein by reference.

Emergency Notification

Although the security system of the invention just described is virtually fraud proof in terms of identifying unknown users, the system as described above does not address the situation of coerced access, whereby an unauthorized user desiring access to a computer system coerces an authorized user into tendering an access request and thereby supplying the biometric sample and personal code necessary for the authorized user to be recognized and given access. This would not be an uncommon occurrence, for example, at an ATM or similar cash dispensing machine, where one simply need wait for another to approach the ATM, and then take control of matters from there.

Accordingly, according to a further aspect of the invention, the security system and method are provided with means for alerting authorities that an access attempt or grant of access has been coerced. The invention further contemplates means for restricting operational functions within the system when access has been achieved through duress.

Preliminary, it should be noted that it is essential that such emergency notification means be invisible, or at least extremely inconspicuous to, the coercing party. Such features would have little value if discoverable, and potentially could result in physical harm to the authorized user.

According to one aspect of the invention, the security system is provided with an emergency notification means that alerts the nearest located police or other designated law enforcement agency that a computer system, such as a credit card account, is being access involuntarily. The means further provides the locality of the access attempt and the name of the authorized user. The means is activated by the user through the entry of the user's personal code. As discussed above, the personal code is generally configured to be numeric and variable in digit length. For the purposes of emergency notification, an authorized user is provided with a personal code having two variants. A standard variant having a fixed sequence of preselected digits, and a series of emergency variants that include an extra emergency digit. The emergency digit is preselected by the user and will correspond to a value that does not appear in the standard variant or alternatively will be a repeat of one of the digits in the standard variant. Thus, when the authorized user attempts access, he may enter one of the emergency variants, thereby triggering the emergency notification means without the knowledge of the third party. After entry of the personal code, the access procedure continues normally so as not to alert the third party that help has been sought.

According to another aspect of the invention, means for access limitation is provided. As will be understood, it is necessary for the access procedure to continue and everything appear to be normal to the coercing third party. However, once access is provided, the third party will be able to carry out any transaction authorized to the coerced user until the third party is satisfied or captured. The means for access limitation is designed to respond to this situation by automatically imposing limitations of the types and amounts of transaction that can be carried out when access has been coerced. Such means would be triggered automatically by activation of the emergency notification means and transmit an access limitation request to the computer system or systems to be accessed. This request would prompt the computer system to restrict access as predetermined by the authorized user, generating the necessary false screens and reports and providing the necessary false responses to inquires that would be necessary and consistent with the restricted access. For example, the user's checking account balance may be reduced to reflect an availability of funds consistent with restrictions. Alternatively, the computer system may provide a false, but otherwise standard error message or display screen to indicate that a particular type of transaction or account is temporarily unavailable due to mechanical error or the like. It will be appreciated that means for achieving the impositions of such limitations are know and are in use currently by, for example, financial institutions when a customer reports a lost credit or ATM card.

From the discussion above, it will now be apparent that the system of the invention is superior to existing security systems, such as token and code systems, and that the security system and method of the invention is particularly and ideally suited to securing computerized commercial systems and the transactions that take place there to the benefit of consumers, bankers, merchants and the like.

For the consumer, the present system represents the ultimate in convenience. The cumbersome and awkward tokens now required, such as ATM and credit cards, are eliminated, relying instead on the customer's morphology, which of necessity goes where the consumer goes and cannot be lost or stolen. Further, the system augers the union or cross-networking of all financial transactions, permitting each individual to access all of his financial accounts and make all commercial transactions that currently requires the use of a variety of cards, the remembering of innumerable codes, and the not infrequent trip to the institution.

The present invention affords, banks, credit card companies and other financial institutions with an unparalleled opportunity to streamline operations, cut costs and increase system security. First, the elimination of tokens translates directly into savings that otherwise would have been expended on manufacturing, distributing and replacing the millions of credit cards now in circulation. Moreover, the system fosters and promotes the electronic transaction, thereby saving financial institutions the expense arising from everything such as personnel to paper costs. Further, the significant reduction in potential for fraud translates into substantial sums no longer being misappropriated or stolen electronically, costs that today are generally passed in the form of lower interest rates and higher fees.

The present system also benefits merchants by making electronic debit of bank accounts at pay points in retail stores a reality, and further reduces merchant costs by eliminating handling of cash and the authorization procedures associated with checks and credit cards. It may also benefit merchants by encouraging to spend consumers who no longer need visit ATMs or carry checkbooks.

The specific embodiments having now been described, the invention appreciated. However, it will be understood that the discussion above is intended for illustrative and explanatory purposes only and are in no way intended to limit the invention, the nature and scope of which are defined by the claims below.

I claim:

1. A tokenless security system partially to fully operationally integrated with and dedicated to a computer system for preventing unauthorized access of said designated computer system by determining an unknown user's identity from an examination of unique biometric characteristics that are specific to the user, said security system comprising:
   a) means for gathering and recording a biometric sample taken directly and physically from an unknown user, said means otherwise operationally isolated and distinct from said computer system;
   b) means interconnecting said gathering means and said computer system for transmitting the gathered biometric sample to said secured computer system;
   c) means integral with said computer system for receiving, storing, retrieving and identifying the gathered biometric sample;
   d) means integral with said computer system for receiving, storing, retrieving and identifying an authenticated biometric sample obtained from each authorized user of said computer system, access to and manipulation of the authenticated biometric samples limited to systems functions necessary for operation of said security system and to specific users charged with updating and maintaining the authenticated biometric samples;
   e) means integral with said computer system for comparing the biometric sample of the unknown user with an authenticated biometric sample obtained from other authorized user, and for generating a correlation factor of a first type from each comparison;
   f) means for evaluating each correlation factor generated by said comparing means in order to determine whether the unknown user is one of said authorized users; and
   g) means for use by an authorized user, unapparent to a coercive third party, for notifying designated authorities that the authorized user's access attempt is being coerced, wherein the authorized user is assigned a variable personal code comprising at least two variants, a standard variant which the authorized user enters when the access attempt is voluntary, and one or more alternative variants, any one of which is entered by the authorized user when an access attempt is being coerced.

2. The system according to claim 1 further comprising means for limiting access to said computer system when an authorized user has been coerced or otherwise involuntarily forced to request access to a computer system, said means providing a predetermined reduced level of access to said computer system limiting the number, type and amount of applications or transactions that can be conducted, said means further configured to generate false error messages and/or other false screen displays, and to provide false responses to operational requests that are reflective of and consistent with the user's reduced level of access in order minimize the third party's ability to discover that access has been limited and/or that authorities have been notified.

3. The system of claim 1 wherein the biometric sample is derived from a finger, thumb or palm print; a voice print; a handwriting sample or a retinal vascular pattern.

4. The system of claim 1 wherein the biometric sample is derived from a finger print, a thumb print, a palm print or a combination thereof.

5. The system of claim 1 wherein the personal code of each authorized user is numeric and variable in digit length between authorized users.

6. The system of claim 1 wherein each authorized user is assigned a proprietary personal code; wherein said security system is further provided with a means operationally isolated from said computer system for receiving and recording a personal code input by the individual; wherein said connecting means is also adapted to transmit the personal code from said receiving means to said computer system; wherein said security system is further provided with a means integral with said secured computer system for assigning, storing, retrieving and identifying a personal code proprietary for each authorized user; wherein said evaluating means comprises a determination routine and a confirmation routine, said determination routine configured to analyze each first type correlation factor to determine whether the individual can be identified as a specific authorized user, said confirmation routine configured to compare the personal code entered by the individual to the personal code assigned by the security system to the specific authorized user identified by the determination routine to confirm identification of the individual as the specific authorized user when the compared personal codes are the same.

7. The system of claim 6 further comprising emergency means for use by an authorized user in notifying police or other designated authority that the authorized user access attempt is being coerced by a third party, which means remains unapparent to the coercive third party.

8. The system of claim 7 wherein an authorized user is assigned a variable personal code comprising at least two variants, a standard variant which the authorized user enters when an access attempt is voluntary, and one or more alternative variants, any of which can be entered by the authorized user when an access attempt is being coerced.

9. The system according to claim 7 further comprising means for limiting access to said computer system when an authorized user has been coerced or otherwise involuntarily forced to request access to said computer system, said means providing a predetermined reduced level of access to said secured computer system limiting the number, type and amount of applications or transactions that can be conducted, said means further configured to generate false error messages and/or other false screen displays, and to provide false responses to operational requests that are reflective of and consistent with the user's reduced level of access in order minimize the third party's ability to discover that access has been limited and/or that authorities have been notified.

10. The system of claim 6 wherein the biometric sample is derived from a finger, thumb or palm print; a voice print; a handwriting sample or a retinal vascular pattern.

11. The system of claim 6 wherein the biometric sample is derived from a finger print, a thumb print, a palm print or a combination thereof.

12. The system of claim 6 wherein the personal code of each authorized user is numeric and variable in digit length between authorized users.

13. The system of claim 6 wherein said security system is provided with means for variabilizing a starting code assigned to each authorized user in a predictable but proprietary fashion to generate a progressive series of unique personal codes for each authorized user, each unique code characterized by a fixed numeric position in the progressive series relative to the starting code and valid for entry only with a corresponding access attempt characterized by the same numeric position relative the a first access attempt; wherein said security system is provided with means integral with said computer system for differentiating and accounting for each access attempt of each authorized user and for determining therefrom the numeric position of the next access attempt for each authorized user relative to each authorized user's first access attempt; means for identifying the valid unique personal code for the determined next attempted access of each authorized user; wherein said confirmation routine is configured to receive the unique personal code assigned to and valid for the next attempted access determined for the authorized user selected by the determination routine and to confirm identification of the individual as the selected authorized user when the personal code input by the individual and the unique personal code assigned to the selected authorized user are the same.

14. The system of claim 13 further comprising emergency means for use by an authorized user in notifying police or other designated authority that the authorized user access attempt is being coerced by a third party, which means remains unapparent to the coercive third party.

15. The system of claim 13 further comprising means for limiting access to said computer system when an authorized user has been coerced or otherwise involuntarily forced to request access to a computer system, said means providing a predetermined reduced level of access to said computer system limiting the number, type and amount of applications or transactions that can be conducted, said means further configured to generate false error messages and/or other false screen displays, and to provide false responses to operational requests that are reflective of and consistent with the user's reduced level of access in order minimize the third party's ability to discover that access has been limited and/or that authorities have been notified.

16. The system of claim 6 wherein the biometric sample is derived from a finger, thumb or palm print; a voice print; a handwriting sample or a retinal vascular pattern.

17. The system of claim 6 wherein the biometric sample is derived from a finger print, a thumb print, a palm print or a combination thereof.

18. The system of claim 6 wherein the personal code of each authorized user is numeric and variable in digit length between authorized users.

19. The system of claim 1 wherein each authorized user is assigned a proprietary personal code; wherein said security system is further provided with a means operationally isolated from said secured computer system for receiving and recording a personal code entered by the individual; wherein said connecting means is also adapted to transmit the personal code to said computer system; wherein said security system is further provided with a means integral with said computer system for assigning, storing, retrieving and identifying a personal code for each authorized user of said secured computer system; wherein said comparison means is adapted to receive and relate the personal code entered by the individual with the biometric sample collected from the individual, and to receive and relate the personal code assigned to each authorized user with a corresponding authenticated biometric sample obtained from each authorized user, and thereafter combine the related codes and biometric samples to generate a correlation factor of a second type; said evaluating means adapted to receive and evaluate each second type correlation factor generated by said comparison means in order to determine whether the individual is an authorized user of said secured computer system.

20. The system of claim 19 further comprising emergency means for use by an authorized user in notifying police or other designated authority that the authorized user access attempt is being coerced by a third party, which means remains unapparent to the coercive third party.

21. The system of claim 20 wherein an authorized user is assigned a variable personal code comprising at least two variants, a standard variant which the authorized user enters when an access attempt is voluntary, and one or more alternative variants, any one of which is entered by the authorized user when an access attempt is being coerced.

22. The system according to claim 19 further comprising means for limiting access to said computer system when an authorized user has been coerced or otherwise involuntarily forced to request access to a secured computer, said means providing a predetermined reduced level of access to said secured computer system limiting the number, type and amount of applications or transactions that can be conducted, said means further configured to generate false error messages and/or other false screen displays, and to provide false responses to operational requests that are reflective of and consistent with the user's reduced level of access in order minimize the third party's ability to discover that access has been limited and/or that authorities have been notified.

23. The system of claim 19 wherein the biometric sample is derived from a finger, thumb or palm print; a voice print; a handwriting sample or a retinal vascular pattern.

24. The system of claim 19 wherein the biometric sample is derived from a finger print, a thumb print, a palm print or a combination thereof.

25. The system of claim 19 wherein the personal code of each authorized user is numeric and variable in digit length between authorized users.

26. The system of claim 19 wherein said security system is provided with means for variabilizing a starting code assigned to each authorized user in a predictable but proprietary fashion to generate a progressive series of unique personal codes for each authorized user, each unique personal code having a fixed numeric position determined relative to the starting code of an authorized user and valid only during the access attempt of the authorized user having the same numerical position relative to a first access attempt of the authorized user; wherein said security system is provided with means integral with said computer system for tracking and recording each access attempt of each authorized user and determining therefrom the numeric position of the next attempted access for each authorized user relative to said authorized user's first access attempt; means for determining the unique personal code corresponding to next attempted access for each authorized user by selecting the unique personal code at the numeric position calculated for the next attempted access for said authorized user; wherein said comparing means receives and relates the personal code and biometric sample entered by the unknown user and the unique personal code valid for the next attempted access by each of said authorized users, and thereafter combines the related codes and biometric samples in order to generate a correlation factor of a third type; said evaluating means adapted to receive and evaluate each third type correlation factor generated by said comparison means in order to determine whether the individual is one of said authorized users.

27. The system of claim 26 further comprising emergency means for use by an authorized user in notifying police or other designated authority that the authorized user access attempt is being coerced by a third party, activation of which means is unapparent to the coercive third party.

28. The system according to claim 26 further comprising means for limiting access to said computer system when an authorized user has been coerced or otherwise involuntarily forced to request access to a secured computer, said means providing a predetermined reduced level of access to said secured computer system limiting the number, type and amount of applications or transactions that can be conducted, said means further configured to generate false error messages and/or other false screen displays, and to provide false responses to operational requests that are reflective of and consistent with the user's reduced level of access in order minimize the third party's ability to discover that access has been limited and/or that authorities have been notified.

29. The system of claim 26 wherein the biometric sample is derived from a finger, thumb or palm print; a voice print; a handwriting sample or a retinal vascular pattern.

30. The system of claim 26 wherein the biometric sample is derived from a finger print, a thumb print, a palm print or a combination thereof.

31. The system of claim 26 wherein the personal code of each authorized user is numeric and variable in digit length between authorized users.

32. A tokenless method for preventing unauthorized access to a secured computer system by identifying an unknown user from an examination of unique biometric characteristics personal to the user, said method comprising the steps of:

a) gathering and recording a biometric sample and personal identification code from the unknown user by sensor means that are otherwise operatively connected to said secured computer system; wherein a personal identification code is selected by authorized users and each personal identification code comprises a standard variant for entry when an access attempt is voluntary and one or more emergency variants, any one of which is entered to indicate that the authorized user's access attempt is involuntarily coerced;

b) transmitting the biometric sample and personal identification code to said computer system;

wherein an authorized user can use an emergency variant rather than the standard variant to generate a signal undetectable to a coercive party, said signal to be transmitted to designated authorities that the authorized user's access attempt is being coerced or otherwise involuntary;

c) comparing the biometric sample gathered from the unknown user with an authenticated biometric sample of other authorized users stored within said secured computer system and generating a correlation factor of a first type for each comparison performed;

d) analyzing each of the first type correlation factors so generated to determine whether the individual is an authorized user of the system; and e) confirming the determination of the unknown user's identity by matching the personal identification code entered by the unknown user with the personal identification code selected by the specific authorized user.

33. The method of claim 32 further comprising the additional step of limiting the scope of access extended to an authorized user whose access has been involuntary and coerced by limiting the type, number and value of transactions that can be carried out by the authorized user, and by generating misinformation for display to the coercing party in the form of false error messages or other screen displays and by providing false responses to operational requests, all of which are configured to be consistent with the various access limitations imposed on the authorized user.

34. The method of claim 32 wherein the biometric sample is derived from a finger, thumb or palm print; a voice print; a handwriting sample or a retinal vascular pattern.

35. The method of claim 32 wherein the biometric sample is derived from a finger print, a thumb print, a palm print or a combination thereof.

36. The method of claim 32 wherein the personal code of each authorized user is numeric and variable in digit length between authorized users.

37. The method of claim 32 wherein each authorized user is assigned a particular starting code that is variabilized in a predictable but proprietary fashion to generate a progressive series of unique personal codes, each unique personal code of a selected authorized user characterized by a numeric position relative to the starting code of the selected authorized user and valid for use only during the access attempt of the same numerical position relative to the first access attempt of the selected authorized user; said method further comprising the step of the unknown user entering a personal code following entry of the biometric sample; wherein the transmitting step is modified to provide for transmission of both the collected biometric sample and the entered personal code wherein each correlation factor is analyzed to determine whether the individual can be identified with a selected authorized user; and further comprising the steps of determining the number of the access attempt for the selected authorized user, identifying the unique personal code of the selected authorized user corresponding to the access attempt; confirming identification of the individual as the selected authorized user if the personal code entered by the user matches the valid unique personal code of the selected authorized user.

38. The method of claim 37 further comprising the step of an authorized user generating an emergency notification undetectable to the coercive party, said signal to transmitted to designated authorities that the authorized user's access attempt is being coerced or otherwise involuntary.

39. The method of claim 37 further comprising the additional step of limiting the scope of access extended to an authorized user whose access has been involuntary and coerced by limiting the type, number and value of transactions that can be carried out by the authorized user, and by generating misinformation for display to the coercing party in the form of false error messages or other screen displays and by providing false responses to operational requests, all of which are configured to be consistent with and provide support for the various access limitations imposed on the authorized user.

40. The method of claim 37 wherein the biometric sample is derived from a finger, thumb or palm print; a voice print; a handwriting sample or a retinal vascular pattern.

41. The method of claim 37 wherein the biometric sample is derived from a finger print, a thumb print, a palm print or a combination thereof.

42. The method of claim 37 wherein the personal code of each authorized user is numeric and variable in digit length between authorized users.

43. A tokenless, stand alone security system operationally independent but interconnected to and preventing unauthorized access of one or more computer systems by determining an unknown user's identity from an examination of unique biometric characteristics personal to the unknown user, said security system further interconnecting said one or more computer systems to authorized users thereof, mediating at least some aspects of interactions between each of said one or more computer systems and the authorized users thereof, said system comprising:

a) means for gathering and recording a biometric sample from the unknown user's person, said gathering means distinct and otherwise operationally isolated from said security system;

b) means for transmitting the gathered biometric sample of the unknown individual to said security system;

c) means integral with said security system for receiving, storing, retrieving and identifying the gathered biometric sample of the unknown individual;

d) means integral with said security system for receiving, storing, retrieving and identifying an authenticated biometric sample obtained from and specific to each authorized user of said one or more secured computer systems;

e) means integral with said security system for comparing the gathered biometric sample of the individual with an authenticated biometric sample derived from other authorized users of said one or more secured computer systems and for generating from each comparison a correlation factor of a first type;

f) means for evaluating each first type correlation factor generated by said comparison means to determine whether the individual is an authorized user; and g) means for use by an authorized user, unapparent to a coercive third party, for notifying designated authorities that the authorized user's access attempt is being coerced, wherein the authorized user is assigned a variable personal code comprising at least two variants, a standard variant which the authorized user enters when the access attempt is voluntary, and one or more alternative variants, any one of which is entered by the authorized user when an access attempt is being coerced.

44. The system of claim 43 further comprising emergency means for use by an authorized user in notifying police or other designated authority that the authorized user access attempt is being coerced by a third party, which means is unapparent to the coercive third party.

45. The system according to claim 43 further comprising means for limiting access to said computer system when an authorized user has been coerced or otherwise involuntarily forced to request access to a computer system, said means providing a predetermined reduced level of access to said computer system limiting the number, type and amount of applications or transactions that can be conducted, said means further configured to generate false error messages and/or other false screen displays, and to provide false responses to operational requests that are reflective of and consistent with the user's reduced level of access in order minimize the third party's ability to discover that access has been limited and/or that authorities have been notified.

46. The system of claim 43 wherein the biometric sample is derived from a finger, thumb or palm print; a voice print; a handwriting sample or a retinal vascular pattern.

47. The system of claim 43 wherein the biometric sample is derived from a finger print, a thumb print, a palm print or a combination thereof.

48. The system of claim 43 wherein the personal code of each authorized user is numeric and variable in digit length between authorized users.

49. The system of claim 43 wherein each authorized user is assigned a personal code, said system further comprising means for recording entry of a personal code by the unknown individual and transmitting the entered code to said security system, said means distinct and otherwise operationally isolated from said security system; means integral with said security system for receiving, storing, retrieving and identifying the personal code entered by the individual; means integral with said security system for assigning a personal code to each authorized user and for storing, retrieving and identifying each personal code assigned to each authorized user of said one or more computer systems; wherein said evaluating means comprises a determination routine and a confirmation routine, said determination routine configured to analyze each first type correlation factor to determine whether the individual can be identified as a specific authorized user, said confirmation routine configured to compare the personal code entered by the individual to the personal code assigned to the specific authorized user and confirm the individual's identification as the selected authorized user when the compared personal codes are the same.

50. The security system of claim 49 further comprising emergency means for use by an authorized user in notifying police or other designated authority that the authorized user access attempt is being coerced by a third party, which means can be activated by the individual remain unapparent to the coercive third party.

51. The system of claim 50 wherein an authorized user is assigned a variable personal code comprising at least two variants, a standard variant which the authorized user enters when an access attempt is voluntary, and one or more alternative variants, any of which can be entered by the authorized user when an access attempt is being coerced.

52. The system according to claim 49 further comprising means for limiting access to said computer system when an authorized user has been coerced or otherwise involuntarily forced to request access to a secured computer, said means configured be activated by a signal generated by said emergency notification means and upon activation to provide a predetermined reduced level of access to said secured computer system limiting the number, type and amount of applications or transactions that can be conducted, said means further configured to generate false error messages and/or other fabricated screen displays, and to provide false responses to operational requests that are reflective of and consistent with the user's reduced level of access in order minimize the third party's ability to discover that access has been limited and/or that authorities have been notified.

53. The system of claim 49 wherein the biometric sample is derived from a finger, thumb or palm print; a voice print; a handwriting sample or a retinal vascular pattern.

54. The system of claim 49 wherein the biometric sample is derived from a finger print, a thumb print, a palm print or a combination thereof.

55. The system of claim 49 wherein the personal code of each authorized user is numeric and variable in digit length between authorized users.

56. The system of claim 49 wherein said security system is provided with means for variabilizing a starting code assigned to each authorized user in a predictable but proprietary fashion to generate a progressive series of unique personal codes for each authorized user, each unique code characterized by a fixed numeric position in the progressive series relative to the starting code and valid for entry only with a corresponding access attempt characterized by the same numeric position relative the a first access attempt; wherein said security system is provided with means integral with said secured computer system for differentiating and accounting for each access attempt of each authorized user and for determining therefrom the numeric position of the next access attempt for each authorized user relative to each authorized user's first access attempt; means for identifying the valid unique personal code for the determined next attempted access of each authorized user; wherein said confirmation routine is configured to receive the unique personal code assigned to and valid for the next attempted access of determined for the authorized user selected by the determination routine and to confirm identification of the individual as the selected authorized user when the personal code input by the individual and the unique personal code assigned to the selected authorized user are the same.

57. The system of claim 56 further comprising emergency means for use by an authorized user in notifying police or other designated authority that the authorized user access attempt is being coerced by a third party, which means can be activated by the individual remain unapparent to the coercive third party.

58. The system of claim 56 further comprising means for limiting access to said computer system when an authorized user has been coerced or otherwise involuntarily forced to request access to a secured computer, said means configured be activated by a signal generated by said emergency notification means and upon activation to provide a predetermined reduced level of access to said secured computer system limiting the number, type and amount of applications or transactions that can be conducted, said means further configured to generate false error messages and/or other fabricated screen displays, and to provide false responses to operational requests that are reflective of and consistent with the user's reduced level of access in order minimize the third party's ability to discover that access has been limited and/or that authorities have been notified.

59. The system of claim 56 wherein the biometric sample is derived from a finger, thumb or palm print; a voice print; a handwriting sample or a retinal vascular pattern.

60. The system of claim 56 wherein the biometric sample is derived from a finger print, a thumb print, a palm print or a combination thereof.

61. The system of claim 43 wherein each authorized user is assigned a proprietary personal code; said system further comprising means for receiving and recording a personal code entered by the individual, said means distinct and otherwise operationally isolated from said security system; wherein said connecting means is adapted to transmit both the gathered biometric sample and the entered personal code of the unknown individual; said system further provided with means integral with said security system for assigning a personal code to each authorized user and for storing, retrieving and identifying each personal code assigned to each authorized user of said one or more secured computer systems; wherein said comparison means is adapted to receive and relate the personal code entered by the individual with the biometric sample gathered from the individual, and to receive and relate the personal code assigned to each authorized user with a corresponding authenticated biometric sample obtained from each authorized user, said comparison means ultimately combining related pairs of personal codes and biometric samples to generate a correlation factor of a second type; said evaluating means adapted to receive and evaluate each second type correlation factor generated by said comparison means in order to determine whether the individual is an authorized user of said secured computer system.

62. The system of claim 61 further comprising emergency means for use by an authorized user in notifying police or other designated authority that the authorized user access attempt is being coerced by a third party, which means can be activated by the individual remain unapparent to the coercive third party.

63. The system of claim 62 wherein an authorized user is assigned a variable personal code comprising at least two variants, a standard variant which the authorized user enters when an access attempt is voluntary, and one or more alternative variants, any of which can be entered by the authorized user when an access attempt is being coerced.

64. The system according to claim 61 further comprising means for limiting access to said computer system when an authorized user has been coerced or otherwise involuntarily forced to request access to a secured computer, said means configured be activated by a signal generated by said emergency notification means and upon activation to provide a predetermined reduced level of access to said secured computer system limiting the number, type and amount of applications or transactions that can be conducted, said means further configured to generate false error messages and/or other fabricated screen displays, and to provide false responses to operational requests that are reflective of and consistent with the user's reduced level of access in order minimize the third party's ability to discover that access has been limited and/or that authorities have been notified.

65. The system of claim 61 wherein the biometric sample is derived from a finger, thumb or palm print; a voice print; a handwriting sample or a retinal vascular pattern.

66. The system of claim 61 wherein the biometric sample is derived from a finger print, a thumb print, a palm print or a combination thereof.

67. The system of claim 61 wherein the personal code of each authorized user is numeric and variable in digit length between authorized users.

68. The system of claim 61 wherein said security system is provided with means for variabilizing a starting code assigned to each authorized user in a predictable but proprietary fashion to generate a progressive series of unique personal codes for each authorized user, each unique personal code having a fixed numeric position determined relative to the relative to the starting code of an authorized user and valid only during the access attempt of the authorized user having the same numerical position relative to a first access attempt of the authorized user; wherein said security system is provided with means integral with said secured computer system for tracking and recording each access attempt of each authorized user and determining therefrom the numeric position of the next attempted access for each authorized user relative to each authorized user's first access attempt; means for determining the unique personal code corresponding to next attempted access for each authorized user by selecting the unique personal code at the numeric position calculated for the next attempted access for each authorized user; wherein said comparing means receives and relates the personal code and biometric sample entered by the individual and the unique personal code valid for the next attempted access by each of the authorized users, and thereafter compare combining the related codes and biometric samples in order to generate a correlation factor of a third type; said evaluating means adapted to receive and evaluate each third type correlation factor generated by said comparison means in order to determine whether the individual is an authorized user of said secured computer system.

69. The system of claim 68 further comprising emergency means for use by an authorized user in notifying police or other designated authority that the authorized user access attempt is being coerced by a third party, activation of which means is unapparent to the coercive third party.

70. The system according to claim 69 further comprising means for limiting access to said computer system when an authorized user has been coerced or otherwise involuntarily forced to request access to a secured computer, said means configured be activated by a signal generated by said emergency notification means and upon activation to provide a predetermined reduced level of access to said secured computer system limiting the number, type and amount of applications or transactions that can be conducted, said means further configured to generate false error messages and/or other fabricated screen displays, and to provide false responses to operational requests that are reflective of and consistent with the user's reduced level of access in order minimize the third party's ability to discover that access has been limited and/or that authorities have been notified.

71. The system of claim 68 wherein the biometric sample is derived from a finger, thumb or palm print; a voice print; a handwriting sample or a retinal vascular pattern.

72. The system of claim 68 wherein the biometric sample is derived from a finger print, a thumb print, a palm print or a combination thereof.

73. A tokenless, stand alone security system operationally independent of but interconnected to and preventing unauthorized access of one or more computer systems by determining an unknown user's identity from an examination of unique biometric characteristics personal to the unknown user, said security system limited in operative interaction to said one or more computer systems and isolated from authorized users of said one or more computer systems, said system comprising:

a) means for gathering and recording a biometric sample from the unknown user's person, said gathering means distinct and otherwise operationally isolated from said one or more computer systems;

b) means for transmitting the gathered biometric sample of the unknown user to one of said one or more computer systems;

c) means integral with said computer system for receiving the gathered biometric sample and forwarding it to said security system;

d) means integral with said security system for receiving, storing, retrieving and identifying the gathered biometric sample of the unknown individual;

e) means integral with said security system for receiving, storing, retrieving and identifying an authenticated biometric sample obtained from and specific to each authorized user of said one or more secured computer systems;

f) means integral with said security system for comparing the gathered biometric sample of the individual with an authenticated biometric sample derived from other authorized users of said one or more secured computer systems and for generating from each comparison a correlation factor of a first type;

g) means for evaluating each first type correlation factor generated by said comparison means to determine whether the individual is an authorized user; and h) means for use by an authorized user, unapparent to a coercive third party, for notifying designated authorities that the authorized user's access attempt is being coerced, wherein the authorized user selects a variable personal code comprising at least two variants, a standard variant which the authorized user enters when the access attempt is voluntary, and one or more alternative variants, any one of which is entered by the authorized user when an access attempt is being coerced.

74. The system of claim 73 further comprising emergency means for use by an authorized user in notifying police or other designated authority that the authorized user access attempt is being coerced by a third party, which means is unapparent to the coercive third party.

75. The system according to claim 73 further comprising means for limiting access to said computer system when an authorized user has been coerced or otherwise involuntarily forced to request access to a computer system, said means providing a predetermined reduced level of access to said computer system limiting the number, type and amount of applications or transactions that can be conducted, said means further configured to generate false error messages and/or other false screen displays, and to provide false responses to operational requests that are reflective of and consistent with the user's reduced level of access in order minimize the third party's ability to discover that access has been limited and/or that authorities have been notified.

76. The system of claim 73 wherein the biometric sample is derived from a finger, thumb or palm print; a voice print; a handwriting sample or a retinal vascular pattern.

77. The system of claim 73 wherein the biometric sample is derived from a finger print, a thumb print, a palm print or a combination thereof.

78. The system of claim 73 wherein the personal code of each authorized user is numeric and variable in digit length between authorized users.

79. The system of claim 73 wherein each authorized user is assigned a personal code, said system further comprising means for recording entry of a personal code by the unknown individual and transmitting the entered code to said security system, said means distinct and otherwise operationally isolated from said security system; means integral with said security system for receiving, storing, retrieving and identifying the personal code entered by the individual; means integral with said security system for assigning a personal code to each authorized user and for storing, retrieving and identifying each personal code assigned to each authorized user of said one or more computer systems; wherein said evaluating means comprises a determination routine and a confirmation routine, said determination routine configured to analyze each first type correlation factor to determine whether the individual can be identified as a specific authorized user, said confirmation routine configured to compare the personal code entered by the individual to the personal code assigned to the specific authorized user and confirm the individual's identification as the selected authorized user when the compared personal codes are the same.

80. The security system of claim 79 further comprising emergency means for use by an authorized user in notifying police or other designated authority that the authorized user access attempt is being coerced by a third party, which means can be activated by the individual remain unapparent to the coercive third party.

81. The system of claim 80 wherein an authorized user is assigned a variable personal code comprising at least two variants, a standard variant which the authorized user enters when an access attempt is voluntary, and one or more alternative variants, any of which can be entered by the authorized user when an access attempt is being coerced.

82. The system according to claim 79 further comprising means for limiting access to said computer system when an authorized user has been coerced or otherwise involuntarily forced to request access to a secured computer, said means configured be activated by a signal generated by said emergency notification means and upon activation to provide a predetermined reduced level of access to said secured computer system limiting the number, type and amount of applications or transactions that can be conducted, said means further configured to generate false error messages and/or other fabricated screen displays, and to provide false responses to operational requests that are reflective of and consistent with the user's reduced level of access in order minimize the third party's ability to discover that access has been limited and/or that authorities have been notified.

83. The system of claim 79 wherein the biometric sample is derived from a finger, thumb or palm print; a voice print; a handwriting sample or a retinal vascular pattern.

84. The system of claim 79 wherein the biometric sample is derived from a finger print, a thumb print, a palm print or a combination thereof.

85. The system of claim 79 wherein the personal code of each authorized user is numeric and variable in digit length between authorized users.

86. The system of claim 79 wherein said security system is provided with means for variabilizing a starting code assigned to each authorized user in a predictable but proprietary fashion to generate a progressive series of unique personal codes for each authorized user, each unique code characterized by a fixed numeric position in the progressive series relative to the starting code and valid for entry only with a corresponding access attempt characterized by the same numeric position relative the a first access attempt; wherein said security system is provided with means integral with said secured computer system for differentiating and accounting for each access attempt of each authorized user and for determining therefrom the numeric position of the next access attempt for each authorized user relative to each authorized user's first access attempt; means for identifying the valid unique personal code for the determined next attempted access of each authorized user; wherein said confirmation routine is configured to receive the unique personal code assigned to and valid for the next attempted access of determined for the authorized user selected by the determination routine and to confirm identification of the individual as the selected authorized user when the personal code input by the individual and the unique personal code assigned to the selected authorized user are the same.

87. The system of claim 86 further comprising emergency means for use by an authorized user in notifying police or other designated authority that the authorized user access attempt is being coerced by a third party, which means can be activated by the individual remain unapparent to the coercive third party.

88. The system of claim 86 further comprising means for limiting access to said computer system when an authorized user has been coerced or otherwise involuntarily forced to request access to a secured computer, said means configured be activated by a signal generated by said emergency notification means and upon activation to provide a predetermined reduced level of access to said secured computer system limiting the number, type and amount of applications or transactions that can be conducted, said means further configured to generate false error messages and/or other fabricated screen displays, and to provide false responses to operational requests that are reflective of and consistent with the user's reduced level of access in order minimize the third party's ability to discover that access has been limited and/or that authorities have been notified.

89. The system of claim 86 wherein the biometric sample is derived from a finger, thumb or palm print; a voice print; a handwriting sample or a retinal vascular pattern.

90. The system of claim 86 wherein the biometric sample is derived from a finger print, a thumb print, a palm print or a combination thereof.

91. The system of claim 73 wherein each authorized user is assigned a proprietary personal code; said system further comprising means for receiving and recording a personal code entered by the individual, said means distinct and otherwise operationally isolated from said security system; wherein said connecting means is adapted to transmit both the gathered biometric sample and the entered personal code of the unknown individual; said system further provided with means integral with said security system for assigning a personal code to each authorized user and for storing, retrieving and identifying each personal code assigned to each authorized user of said one or more secured computer systems; wherein said comparison means is adapted to receive and relate the personal code entered by the individual with the biometric sample gathered from the individual, and to receive and relate the personal code assigned to each authorized user with a corresponding authenticated biometric sample obtained from each authorized user, said comparison means ultimately combining related pairs of personal codes and biometric samples to generate a correlation factor of a second type; said evaluating means adapted to receive and evaluate each second type correlation factor generated by said comparison means in order to determine whether the individual is an authorized user of said secured computer system.

92. The system of claim 91 further comprising emergency means for use by an authorized user in notifying police or other designated authority that the authorized user access attempt is being coerced by a third party, which means can be activated by the individual remain unapparent to the coercive third party.

93. The system of claim 92 wherein an authorized user is assigned a variable personal code comprising at least two variants, a standard variant which the authorized user enters when an access attempt is voluntary, and one or more alternative variants, any of which can be entered by the authorized user when an access attempt is being coerced.

94. The system according to claim 91 further comprising means for limiting access to said computer system when an authorized user has been coerced or otherwise involuntarily forced to request access to a secured computer, said means configured be activated by a signal generated by said emergency notification means and upon activation to provide a predetermined reduced level of access to said secured computer system limiting the number, type and amount of applications or transactions that can be conducted, said means further configured to generate false error messages and/or other fabricated screen displays, and to provide false responses to operational requests that are reflective of and consistent with the user's reduced level of access in order minimize the third party's ability to discover that access has been limited and/or that authorities have been notified.

95. The system of claim 91 wherein the biometric sample is derived from a finger, thumb or palm print; a voice print; a handwriting sample or a retinal vascular pattern.

96. The system of claim 91 wherein the biometric sample is derived from a finger print, a thumb print, a palm print or a combination thereof.

97. The system of claim 91 wherein the personal code of each authorized user is numeric and variable in digit length between authorized users.

98. The system of claim 91 wherein said security system is provided with means for variabilizing a starting code assigned to each authorized user in a predictable but proprietary fashion to generate a progressive series of unique personal codes for each authorized user, each unique personal code having a fixed numeric position determined relative to the relative to the starting code of an authorized user and valid only during the access attempt of the authorized user having the same numerical position relative to a first access attempt of the authorized user; wherein said security system is provided with means integral with said secured computer system for tracking and recording each access attempt of each authorized user and determining therefrom the numeric position of the next attempted access for each authorized user relative to each authorized user's first access attempt; means for determining the unique personal code corresponding to next attempted access for each authorized user by selecting the unique personal code at the numeric position calculated for the next attempted access for each authorized user; wherein said comparing means receives and relates the personal code and biometric sample entered by the individual and the unique personal code valid for the next attempted access by each of the authorized users, and thereafter compare combining the related codes and biometric samples in order to generate a correlation factor of a third type; said evaluating means adapted to receive and evaluate each third type correlation factor generated by said comparison means in order to determine whether the individual is an authorized user of said secured computer system.

99. The system of claim 98 further comprising emergency means for use by an authorized user in notifying police or other designated authority that the authorized user access attempt is being coerced by a third party, activation of which means is unapparent to the coercive third party.

100. The system according to claim 99 further comprising means for limiting access to said computer system when an authorized user has been coerced or otherwise involuntarily forced to request access to a secured computer, said means configured be activated by a signal generated by said emergency notification means and upon activation to provide a predetermined reduced level of access to said secured computer system limiting the number, type and amount of applications or transactions that can be conducted, said means further configured to generate false error messages and/or other fabricated screen displays, and to provide false responses to operational requests that are reflective of and consistent with the user's reduced level of access in order minimize the third party's ability to discover that access has been limited and/or that authorities have been notified.

101. The system of claim 98 wherein the biometric sample is derived from a finger, thumb or palm print; a voice print; a handwriting sample or a retinal vascular pattern.

102. The system of claim 98 wherein the biometric sample is derived from a finger print, a thumb print, a palm print or a combination thereof.

103. A tokenless security method incorporated in a security system for preventing unauthorized access to one or more computer systems by identifying an unknown user from an examination of unique biometric characteristics personal to the user, said method comprising the steps of:

a) gathering and recording a biometric sample and personal identification code from the person of the unknown user at a site operationally isolated from said computer system; wherein a personal identification code is selected by authorized users and each personal identification code comprises a standard variant for entry when an access attempt is voluntary and one or more emergency variants, any one of which is entered to indicate that the authorized user's access attempt is involuntarily coerced;

b) transmitting the gathered biometric sample and personal identification code to said computer system; wherein an authorized user can use an emergency variant of the personal identification code to generate an emergency signal undetectable to a coercive party, said signal to be transmitted to designated authorities that the authorized user's access attempt is being coerced or otherwise involuntary;

c) receiving the gathered biometric sample at said computer system and forwarding the gathered biometric sample to said security system;

d) receiving the gathered biometric sample at said security system and thereafter comparing the gathered biometric sample with an authenticated biometric sample derived from other authorized users of said computer system and generating a correlation factor of a first type from each comparison;

e) evaluating each first type correlation factor so generated to determine whether the unknown user is one of the authorized users of said computer system; and f) confirming the determination of the unknown user's identity by matching the personal identification code entered by unknown user with the personal code assigned to the specific authorized user.

104. The method of claim 103 further comprising the additional step of limiting the scope of access extended to an authorized user whose access has been involuntary and coerced by limiting the type, number and value of transactions that can be carried out by the authorized user, and by generating misinformation for display to the coercing party in the form of false error messages or other screen displays and by providing false responses to operational requests, all of which are configured to be consistent with the various access limitations imposed on the authorized user.

105. The method of claim 103 wherein the biometric sample is derived from a finger, thumb or palm print; a voice print; a handwriting sample or a retinal vascular pattern.

106. The method of claim 103 wherein the biometric sample is derived from a finger print, a thumb print, a palm print or a combination thereof.

107. The method of claim 103 wherein the personal code of each authorized user is numeric and variable in digit length between authorized users.

108. The method of claim 103 wherein each authorized user is assigned a particular starting code that is variabilized in a predictable but proprietary fashion to generate a progressive series of unique personal codes, each unique personal code of a selected authorized user characterized by a numeric position relative to the starting code of the selected authorized user and valid for use only during the access attempt of the same numerical position relative to the first access attempt of the selected authorized user; said method further comprising the step of the unknown user entering a personal code following entry of the biometric sample; wherein the transmitting step is modified to provide for transmission of both the collected biometric sample and the entered personal code wherein each correlation factor is analyzed to determine whether the individual can be identified with a selected authorized user; and further comprising the steps of determining the number of the access attempt for the selected authorized user, identifying the unique personal code of the selected authorized user corresponding to the access attempt; confirming identification of the individual as the selected authorized user if the personal code entered by the user matches the valid unique personal code of the selected authorized user.

109. The method of claim 108 further comprising the step of an authorized user generating an emergency notification undetectable to the coercive party, said signal to transmitted to designated authorities that the authorized user's access attempt is being coerced or otherwise involuntary.

110. The method of claim 108 further comprising the additional step of limiting the scope of access extended to an authorized user whose access has been involuntary and coerced by limiting the type, number and value of transactions that can be carried out by the authorized user, and by generating misinformation for display to the coercing party in the form of false error messages or other screen displays and by providing false responses to operational requests, all of which are configured to be consistent with and provide support for the various access limitations imposed on the authorized user.

111. The method of claim 108 wherein the biometric sample is derived from a finger, thumb or palm print; a voice print; a handwriting sample or a retinal vascular pattern.

112. The method of claim 108 wherein the biometric sample is derived from a finger print, a thumb print, a palm print or a combination thereof.

113. The method of claim 108 wherein the personal code of each authorized user is numeric and variable in digit length between authorized users.

* * * * *